May 23, 1967
K. W. THEILE ETAL
3,321,538
HYDROBROMINATION PROCESS
Filed Dec. 26, 1963
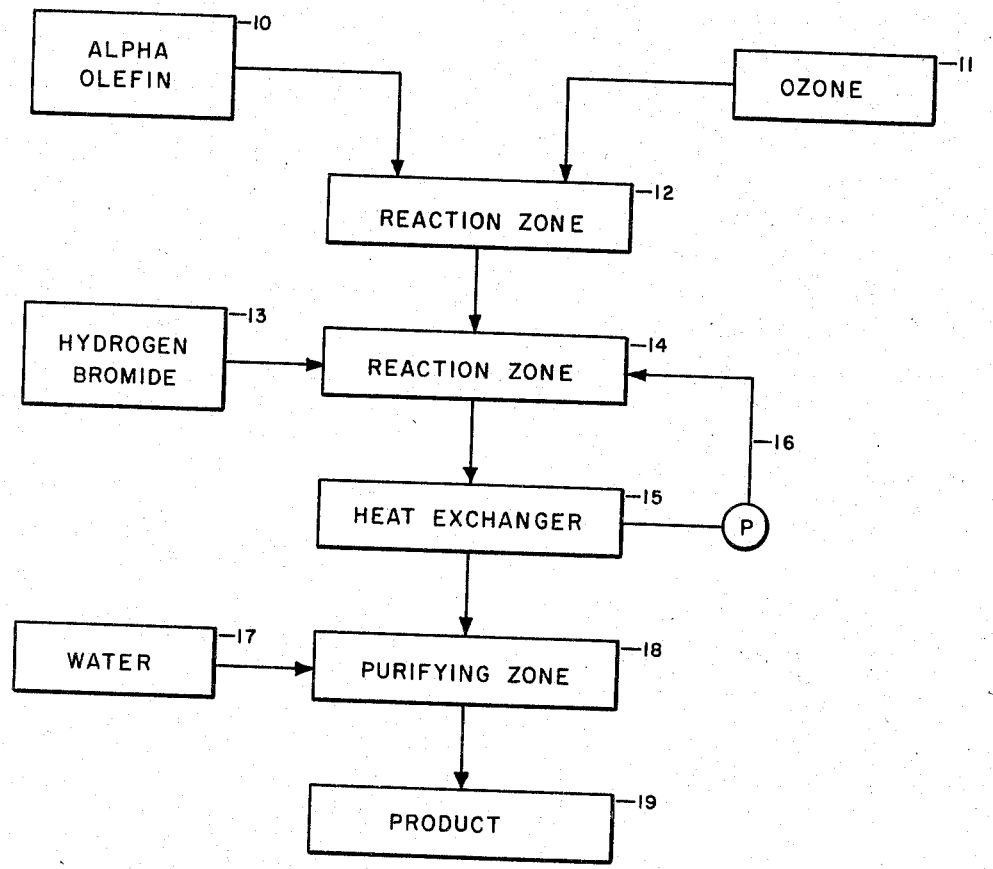
Kenneth W. Theile
Glen R. Wyness
Charles B. McCarty
INVENTORS
BY Richard C. Witte
Julius P. Filcik
ATTORNEYS

United States Patent Office 3,321,538
Patented May 23, 1967

3,321,538
HYDROBROMINATION PROCESS
Kenneth W. Theile, Glen R. Wyness, and Charles B. McCarty, Cincinnati, Ohio, assignors to The Procter & Gamble Company, Cincinnati, Ohio, a corporation of Ohio
Filed Dec. 26, 1963, Ser. No. 333,576
5 Claims. (Cl. 260—663)

This invention relates to a process for the conversion of olefin hydrocarbons to aliphatic bromides. More especially, this invention relates to a hydrohalogenation process involving the addition of hydrogen bromide at the terminal double bond of long chain alpha olefins.

Reactions involving olefins and hydrogen bromide are in general well known being mentioned widely in standard organic chemistry textbooks. It is known, for instance, that the addition of halogen acids to olefinic hydrocarbons generally follows Markownikoff's rule, which states that the halogen will attach to the carbon atom having the fewer hydrogen atoms. This is usually referred to as ionic or normal addition. However, and this also is well known, hydrogen bromide addition can be made to take place in the reverse sense if peroxides are present. This is known as the "peroxide effect" and it provides that the halogen atom will attach to the carbon atom having the most hydrogen atoms. This latter process is sometimes referred to as free radical or abnormal addition.

The formation of several isomeric forms of aliphatic bromides is unavoidable regardless of whether the normal or abnormal addition reaction is attempted. Although the prior art has been developed to the point where it is possible to partially control or direct the reaction of hydrogen halides and olefins to favor the preparation of primary or secondary aliphatic bromides, it has not heretofore been possible to control the hydrogen bromide addition to alpha olefins so as to obtain, if desired, primary aliphatic bromides with only a very minimal amount of secondary aliphatic bromides. Published references dealing with these reactions are notable for the different theories which are offered to explain the mechanisms by which the addition reactions may take place.

According to one theory both the ionic and free radical addition reactions occur simultaneously and compete with each other in any olefin-hydrogen bromide reaction system resulting in the formation of indeterminate amounts of primary and secondary bromides. In conjunction with this theory, it has apparently heretofore been believed that high concentration of hydrogen bromide in the reaction system favored the formation of the less stable and therefore less desirable secondary aliphatic bromide. A corollary belief has been that in order to favor formation of more stable and therefore more desirable primary aliphatic bromides, a low concentration of hydrogen bromide was necessary.

It has now been discovered, contrary to these previous beliefs, that a high concentration of the hydrogen bromide reactant in the alpha-olefin reaction mixture favors the formation of primary aliphatic bromides and not the formation of secondary bromides. This surprising and completely unexpected result has now made it possible to convert alpha olefins almost exclusively to primary aliphatic bromides with the formation of only a very minimal amount of secondary aliphatic bromides. The improved thermal stability of primary bromides over secondary bromides is universally known and needs no documentation or explanation.

It is a primary object of this invention to provide a process for converting alpha-olefin hydrocarbons to primary aliphatic bromides. It is another object to provide a novel process for reacting alpha-olefin hydrocarbons with hydrogen bromide under specific conditions which favor the formation of primary aliphatic bromides and suppress the formation of secondary aliphatic bromides. A further object of this invention is to provide a process for reacting alpha-olefin hydrocarbons and hydrogen bromide to form a reaction product which contains primary aliphatic bromides and secondary aliphatic bromides in a by weight ratio of primary to secondary of from about 50 to 1 to about 90 to 1. These and other objects of the present invention will become apparent to those skilled in the art from a careful reading of the following detailed description.

The attached drawing is a schematic flow sheet depicting the several steps of the process including the reaction zone for contacting ozone with the raw material alpha olefin being hydrobrominated; a dominant bath recycle system including a reaction zone in which hydrogen bromide is reacted with the olefin-ozone mixture forming a reaction mixture, a portion of which is recycled back through a heat exchanger, and a portion of which is passed to a purification zone for the alkyl bromides followed by recovery of the desired final product.

The present invention is based on the discovery that by using considerably more than a stoichiometric ratio of the hydrogen bromide reactant to the liquid alpha-olefin hydrocarbon reactant, and by using sufficient pressure to dissolve the excess hydrogen bromide in the liquid reaction phase, the formation of primary bromide reaction product is favored. Both conditions have been found to be essential to the present invention. This is to say that the use of excess hydrogen bromide without sufficient pressure to dissolve the hydrogen bromide and provide a high concentration in the reaction solution is not enough. It is critical that the excess hydrogen bromide be dissolved in the reaction solution by using sufficient pressure within the reaction system.

The molar excess of hydrogen bromide in the reaction solution can range over very broad limits. Thus, the molar excess of hydrogen bromide can vary from about 10% to about 500%. A preferred molar excess, based primarily on practical considerations, ranges from about 25% to about 200%.

According to the present invention, the hydrogen bromide can be used either as a gas or a liquid without affecting the process. The source of the hydrogen bromide is not critical to the invention and, in fact, any source is contemplated, including the preparation thereof, when desired, by a well known bromine-burning process.

Olefins which can be treated in accordance with the present invention are normally liquid alpha-olefin hydrocarbons containing from about 10 to about 20 carbon atoms. Examples include decene, dodecene, tetradecene, hexadecene, octadecene and eicosene. The olefins can be obtained from any source and include products of catalytic and thermal cracking of oils, and those obtained by dehydrogenating the corresponding paraffin hydrocarbons or by dehydrating alcohols. So-called ethylene build-up alpha olefins can also be used. These compounds are typically made by passing ethylene into trialkyl aluminum at about 212° F. to about 392° F. and at atmospheric or higher pressures for a period of from about several minutes to an hour or more. Usually mixtures of alpha olefins of various and predetermined chain lengths are thus obtained but those containing from about 10 to about 20 carbon atoms are preferred for use in this invention. Pure alpha olefins can also be used in the present process.

The pressure requirements also are not rigidly fixed to any absolute figures. The pressure will depend on such variables as the magnitude of the excess gaseous or liquid hydrogen bromide reactant and the temperature at which the reaction is run. Pressures usually employed range from about 10 p.s.i.g. to about 400 p.s.i.g. It is generally preferred to run the reaction under pressures ranging from about 15 p.s.i.g. to about 100 p.s.i.g. As a general statement it can be said that an increase in pressure tends to favor a higher primary to secondary ratio. It has also been observed that an increase in temperature tends to favor decreasing the primary to secondary ratio. It is for these observations that the present invention cannot be rigidly bound to any absolute figures other than the operable and preferred ranges specified above. For any given case the pressure requirements can be established with a minimum of experimentation.

The temperature of the reaction should be maintained between from about 20° F. to 100° F. and preferably from about 25° F. to about 45° F.

It is necessary to the present invention that a free radical initiator be present during the addition of the hydrogen bromide to the high molecular weight alpha-olefin raw material being treated. While any free radical initiator can be used such as peroxides including, for example, tertiary butyl peroxide, it is preferred to use ozone. Ozone, for reaction with the olefin reactant to form an ozonide free radical initiator, can be obtained or formed in any convenient manner. For example, the ozone formed by passing oxygen through a silent electrical discharge is satisfactory for use in the present process.

The ozonide free radical initiator can be formed by passing ozone into the liquid alpha-olefin raw material being prepared for hydrogen bromide addition. The temperature of the liquid olefin during the addition of the ozone can range from about 10° F. to about 160° F. without noticeable effect on the subsequent reaction with hydrogen bromide. It has been found that the reaction to form the ozonide proceeds rapidly and smoothly. Normally all of the gaseous ozone passed into the liquid alpha olefin promptly reacts with it. This finding is demonstrable in that overhead gases from ozonized oxygen passed through an olefin do not give an oxidation test when bubbled through a potassium iodide solution.

Although the subsequent hydrobromination steps will proceed when amounts of ozone greater, for example, than about 6 mole percent and higher are used, the net result is only to consume greater amounts of the starting alpha-olefin raw material. Therefore, the least amount of ozonide formation that is necessary to catalyze the free radical addition should be used. Accordingly, it has been found that about 0.005 mole percent to about 5.0 mole percent of ozone when added to the olefin gives consistently good results in the practice of the present invention. It is preferred to use from about 0.01 mole percent to about 0.6 mole percent of ozone. It is to be appreciated that the alpha olefin converted to ozonide is essentially lost to the desired alkyl monobromide reaction product emphasizing that the lowest possible mole percentages of ozonide should be formed as are sufficient to catalyze the hydrogen bromide addition reaction. The mole percentages recited above are based on the weight of the starting olefin raw material.

The preceding discussion describes the formation of an ozonide initiator in situ in the reaction stream. An excellent alternative method also is available. The ozonide initiator can be prepared by introducing the requisite amount of ozone into an auxiliary stream of an alpha-olefin raw material to form the ozonide and thereafter feeding the auxiliary stream containing the ozonide initiator into the bulk of olefin raw material to be hydrobrominated. The important consideration is that the ozonide initiator is essential to the free radical reaction. It is less important whether the ozonide is formed in situ in the entire amount of the alpha-olefin raw material or whether it is preformed separately in an auxiliary stream of olefin and fed to the hydrobromination reaction zone. It is possible, moreover, to store the ozonides or olefins containing effective amounts of the ozonide initiator in metal containers for long periods without any apparent reduction in free radical activity.

According to the present invention, the anti-Markownikoff addition reaction of hydrogen bromide to alpha olefins in the presence of a free radical catalyst or initiator is rapidly effected in any reaction system whose materials of construction neither inhibit nor poison the free radical reaction and which can provide for good mass transfer between the hydrogen bromide phase and the liquid alpha-olefin phase. The reaction system should also be able to be maintained under pressures.

It is also essential to the present invention that the reactants be brought into very intimate contact in order for the reaction to proceed as rapidly as desired. Accordingly, provisions must be taken to react the hydrogen bromide and the alpha olefin under conditions of very vigorous mixing. Any reaction unit designed to efficiently mix the reactants and to promote heat and mass transfer can be used in practicing the present invention. A preferred means, however, for carrying on the present invention, is with a dominant bath recycle system, described hereinafter, because it uniquely combines compactness with adequate heat removal capacity. Since the olefin-hydrogen bromide reaction is very highly exothermic, adequate heat removal capacity is a paramount consideration and the problem is handled exceptionally well by a dominant bath recycle system. For purpose of this invention, a dominant bath recycle system includes a reaction zone, a heat exchanger, a pump and a recirculation loop.

The present invention is now generally described in terms of one of its embodiments illustrated in the drawing.

The alpha olefin raw material, previously described, 10, to be hydrobrominated is contacted with a predetermined amount of ozone, 11, in a reaction zone, 12. This results in the formation of a reaction mixture containing alpha-olefin raw material and a small amount of an ozonide corresponding to the starting olefin raw material. The reaction mixture enters the dominant bath recycle system at reaction zone, 14, where hydrogen bromide, 13, is continuously added in an amount which is considerably more than a stoichiometric ratio of hydrogen bromide to olefin. Sufficient pressure is maintained to cause the hydrogen bromide to dissolve in the liquid reaction phase, for example, by controlling the back pressure on the exit alkyl bromide stream.

Within the dominant bath system, the alkyl bromide reaction mixture passes to a heat exchanger, 15, and from the heat exchanger the reaction mixture is continuously split into two fractions, a first fraction which is recirculated via recycle line, 16, to the reaction zone, 14, along with the initial feed of alpha-olefin starting material, the ozonide and hydrogen bromide, and a second fraction which is continuously withdrawn and passed to a purifying zone, 18.

Water, 17, is added into the purifying zone, 19, to remove dissolved hydrogen bromide. The purified alkyl bromide reaction product is then recovered and either stored or used directly from this point. The alkyl bromide containing reaction stream which is continuously withdrawn from the system at a point intermediate the heat exchanger and the reaction zone actually can be purged of excess hydrogen bromide in any suitable manner, such as the water extraction method just mentioned. For example, air, nitrogen or helium, can be passed or bubbled through the reaction product.

The temperature and the duration of the reaction in the dominant bath recycle unit are closely interrelated. Typically, the temperature of the reaction in the dominant bath recycle system is from about 20° F. to about 100° F., and preferably from about 25° F. to about 45° F., with an average residence time within the recycle system of from about 1 minute to about 15 minutes. Generally, an average residence time of from about 3 to about 10 minutes are required and, thus, this is the preferred duration. It should be understood, of course, that the sizing of the equipment used will necessarily determine the preceding process conditions.

The exothermic nature of the olefin-hydrogen bromide reaction is efficiently controlled by recycling a portion of the reaction mixture after it has passed through the heat exchanger, 15. The recycled portion of the reaction mixture is introduced into the reaction zone, 14, along with the initial feed of alpha-olefin raw material, the hydrogen bromide and the ozonide initiator. The recycled portion functions as a heat sink by absorbing the heat of reaction. Generally speaking, the recycle rate of the reaction solution should be not less than about 20 times the rate of the initial feed (20:1). It can range as high as 200:1 but best results are obtained when the recycle rate is within from about 40:1 to about 150:1. The important consideration is to insure control of the reaction temperature in order to favor formation of the desired primary aliphatic bromide isomer and to keep the hydrogen bromide in solution with lower pressures.

The reaction between the hydrogen bromide and alpha-olefins in the presence of their ozonides is rapidly effected in any reactor providing for good mass transfer between the hydrogen bromide and the liquid alpha olefin. Favorable mass transfer conditions for the hydrogen bromide addition can be obtained by bubbling the hydrogen bromide gas through the liquid olefin-ozonide phase, using a porous plate gas distributor to insure small gas bubbles resulting in a large interphase area. Vigorous agitation of the liquid phase also increases mass transfer and aids in maintaining low reaction temperatures. Simple reactors fitted with means for introducing and distributing the hydrogen bromide, dominant bath reactors and wetted wall columns are all useful in effectively carrying out the hydrogen bromide addition reaction.

The ozonide initiated "free radical" hydrobromination reaction is susceptible to poisoning by certain reducing agents. For example, hydrogen sulfide, sulfur dioxide, and nitric oxide quickly poison the ozonide catalyst and low hydrobromination completeness accompanied by a shift toward "normal" less stable alkyl bromide products results. The "free radical" hydrobromination reaction is highly sensitive also to the presence of certain materials of construction in the reaction equipment. Copper, for example, as a material of reactor construction or when exposed to the reactants in any manner has been found to result in unsatisfactory bromination completeness results. The presence of ferrous metals, namely stainless steel, also result in reducing reaction completeness. At increased pressures, reaction completeness in the presence of these metals dropped to levels as low as 85% with increased formation of secondary bromide products and product discoloration. Nickel, glass, glasslined steel and polyvinyl chloride have been found to avoid, or minimize the foregoing deleterious effects and are the preferred materials for the fabrication of equipment for use in carrying out the present process.

The following examples were conducted according to the procedure described above employing a dominant bath recycle system. In each case the starting raw material alpha-olefin composition was treated by passing through it a stream of oxygen containing ozone to prepare the level of ozonide represented in Table I. The olefin-ozonide reaction mixture was metered continuously to a dominant bath recycle system consisting in this case of a centrifugal pump, a heat exchanger and the necessary recycling piping. Anhydrous gaseous hydrogen bromide was metered to the reactor at a rate to give higher than one to one mole ratio of hydrogen bromide to alpha olefin. Excess hydrogen bromide was dissolved in the reaction solution providing a high concentration thereof by controlling the pressure within the system. By employing the conditions set forth in Table I, the excellent ratios of primary to secondary bromides were obtained that were heretofore thought unobtainable.

TABLE I

| | Examples | | | | |
|---|---|---|---|---|---|
| | I | II | III | IV | V |
| Olefin Composition: | | | | | |
| Alpha Olefin, percent | 93.2 | 93.2 | 93.4 | 93.4 | 93.4 |
| Vinylidene Olefin, percent | 4.2 | 4.2 | 4.5 | 4.5 | 4.5 |
| Paraffinic Constituents, percent | 2.4 | 2.4 | 1.7 | 1.7 | 1.7 |
| Ozonide Level, Mole percent | 0.4 | 0.4 | 0.4 | 0.5 | 0.5 |
| Hydrogen Bromide/Olefin Mole Ratio | 1.25 | 1.5 | 1.4 | 1.6 | 1.6 |
| Molar Excess Hydrogen Bromide in Solution, percent | 25.0 | 50.0 | 40.0 | 60.0 | 60.0 |
| Temperature: | | | | | |
| At Inlet to Heat Exchanger, °F | 30 | 30 | 30 | 30 | 30 |
| At Outlet of Heat Exchanger, °F | 25 | 25 | 25 | 25 | 25 |
| Pressure: At Outlet of Heat Exchanger, p.s.i.g. | 10 | 25 | 25 | 25 | 25 |
| Product Composition: | | | | | |
| Primary Bromide, percent | 92.4 | 93.3 | 93.5 | 93.0 | 93.0 |
| Secondary Bromide, percent | 1.6 | 1.1 | 1.8 | 1.1 | 1.4 |
| Paraffin Hydrocarbon, percent | 1.7 | 1.7 | 1.2 | 1.2 | 1.2 |
| Olefin, percent | 1.3 | 2.0 | 0.8 | 2.1 | 1.9 |
| Vinylidene Bromide, percent | 3.0 | 1.9 | 2.7 | 2.6 | 2.6 |
| Ratio of Primary to Secondary | 58:1 | 85:1 | 52:1 | 85:1 | 66:1 |

While this invention has been described with respect to certain embodiments, it is not so limited. Variations and modifications of the present invention will become obvious to those skilled in the art and they can be made without departing from the spirit and scope of this invention.

What is claimed is:

1. A continuous process for converting alpha olefins containing from about 10 to about 20 carbon atoms predominantly to primary aliphatic bromides which comprises the steps of:

treating said alpha olefins with ozone to form a mixture of unreacted alpha olefins and from about 0.005 to about 5.0 mole percent of an ozonide free radical initiator, passing said mixture to a hydrobromination reaction zone in which the pressure is from about 10 p.s.i.g. to about 400 p.s.i.g., introducing hydrogen bromide into said mixture and dissolving it therein, the amount of hydrogen bromide added being in excess of the stoichiometric ratio of hydrogen bromide to said alpha olefin, the molar excess ranging from about 10 mole percent to about 500 mole percent of hydrogen bromide, reacting said reactants under conditions of vigorous mixing and a temperature in the range of from about 20° F. to about 100° F. for an average residence time within said zone of from about 1 to about 15 minutes to form an alkyl bromide reaction product, withdrawing said alkyl bromide reaction product from said hydrobromination reaction zone and passing it to a heat exchanger, splitting the withdrawn reaction product into two fractions, recycling a first fraction to the hydrobromination reaction zone at a rate of from about 20 to about 200 times the rate of the initial feed to said zone, recovering a second fraction containing the aliphatic bromide reaction product.

2. A process according to claim 1 which also includes the step of treating said second fraction with water to remove undissolved hydrogen bromide.

3. The process of claim 1 wherein the residence time within the hydrobromination reaction zone averages from about 3 to about 10 minutes.

4. The process of claim 1 wherein the recycle rate within the dominant bath hydrobromination reaction zone is from about 40:1 to about 150:1.

5. The process of claim 1 wherein the ozonide free radical initiator is present at a level of from about 0.01 mole percent to about 0.6 mole percent and the temperature is maintained between from about 25° F. to about 45° F.

References Cited by the Examiner

UNITED STATES PATENTS

| | | | |
|---|---|---|---|
| 2,058,466 | 10/1936 | Kharasch | 260—663 |
| 2,818,447 | 12/1957 | Neher | 260—663 |
| 3,108,141 | 10/1963 | Gasson et al. | 260—663 |

FOREIGN PATENTS

| | | |
|---|---|---|
| 927,114 | 5/1963 | Great Britain. |
| 843,234 | 8/1960 | Great Britain. |
| 892,329 | 3/1962 | Great Britain. |

OTHER REFERENCES

Walling et al., "J. Amer. Chem. Soc.," vol. 61 (1939), pp. 2693–6.

Mayo et al., "Chem. Reviews," vol. 27 (1940), pp. 366–369, 388–394.

1,051,265 2–1959, German Auslegeserift, 269–663, 1 page spec. no drawing.

BERNARD HELFIN, *Acting Primary Examiner.*

LEON ZITVER, *Examiner.*

K. V. ROCKEY, *Assistant Examiner.*